Figure 1:
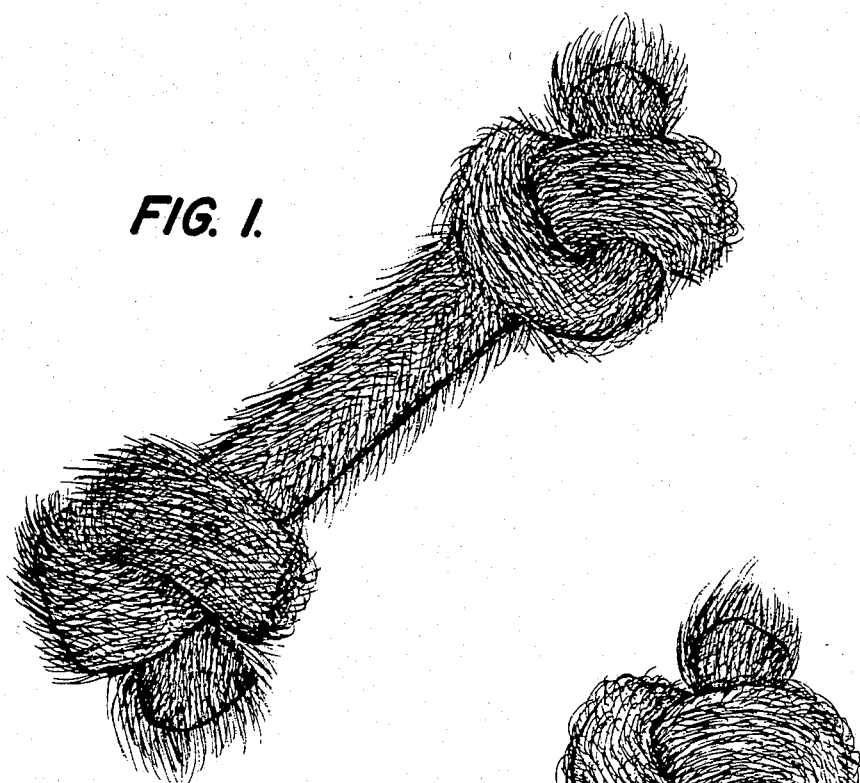

United States Patent [19]

Fisher

[11] Patent Number: 4,535,725

[45] Date of Patent: Aug. 20, 1985

[54] HAIR-CONTAINING RAWHIDE TOYS

[76] Inventor: Stanton E. Fisher, 16 Brentmoor Park, St. Louis, Mo. 63105

[21] Appl. No.: 803,164

[22] Filed: Jun. 3, 1977

[51] Int. Cl.³ .............................................. A01K 29/00
[52] U.S. Cl. ...................................................... 119/29
[58] Field of Search .................... 119/29, 29.5; 46/172, 46/156

[56] References Cited

U.S. PATENT DOCUMENTS

| 1,638,594 | 8/1927 | Myers | 46/156 |
| 2,014,426 | 9/1935 | Dorogi | 46/172 |
| 2,988,045 | 6/1961 | Fisher | 119/29 |
| 3,293,796 | 12/1966 | Strader | 46/156 |
| 3,674,616 | 7/1972 | Howard | 46/156 |

*Primary Examiner*—Robert P. Swiatek
*Attorney, Agent, or Firm*—Sidney B. Ring; Hyman F. Glass; Roger P. Glass

[57] ABSTRACT

This invention relates to toys made of hair-containing rawhide, such as animal toys made thereof.

8 Claims, 7 Drawing Figures

HAIR-CONTAINING RAWHIDE TOYS

In U.S. Pat. No. 2,988,045 there is described and claimed an animal toy prepared from rawhide. Said U.S. Pat. No. 2,988,045 states in Col. 2, line 20: "Rawhide leather is an animal skin or hide which has been dehaired and then dried. No tanning is involved in its manufacture."

I have now discovered that animal toys can also be prepared from rawhide which has not been dehaired. Besides eliminating the step of removing a natural component, i.e., hair, the product is more natural appearing, since it is closer in appearance to the original animal.

The presence of hair masks the inherent variable characteristics of hides such as grease content, pigmentation, texture, cellular structure, courseness or fineness of feel and appearance, etc., thus causing fewer rejections of hides as unsuitable. In addition, variations of hair color in the product enhance interest and attractiveness from the viewpoint of merchandising and use of the product.

Hair-containing rawhide has broad animal appeal. Cats prefer light and fluffy products. The hair on the product is light and fluffy. Some dogs treat a toy as an object to simply hold or groom by licking it, other dogs will chew upon the toy to varying degrees, even to the point of total destruction. The hair-containing toy satisfies both of these needs.

The hair on the product gives a wide range of appearances. It has a slicked down appearance when moist and a fluffy appearance when dry. The hair may be sculpted to give various appearances. Because of its wide range of appearances, the responses of the dog will vary widely.

The presence of hair increases the appearance of size and bulk without increasing the weight beyond a resonable upper limit. Because of its hairy appearance the manageability of the product is less limited by its size, thus permitting a wider range of usage since the size and strength of the pet in relation to the size of the toy is not so critical.

Thus, the appearance of the invention is enhanced from the viewpoint of the animal. The characteristics of hair-containing rawhide cause it to be approached differently by the dog, since carniverous animals such as dogs often play with their prey before, and during, chewing. The presence of hair on the rawhide toy makes it more closely resemble a natural prey that it has captured, giving it a sense of realism. In addition, being of animal origin the product has an appealing animal odor.

The presence of the hair provides additional attributes to the product. The bulk of product is increased and pieces of hide that would appear too small for use without hair can be used since with hair they are larger both in appearance and in actual volume. The use of the full thickness of the hide including the hair yields a maximum product with a minimum of waste. In addition, the necessity of shaping or constructing, such as by folding, rolling or laminating, may be minimized, since with the presence of hair, the resulting bulk and natural appearance, in certain instances allows it to be used as such without shaping or constructing.

For example, single thickness of hair-containing rawhide from certain thicker areas of the animal such as the head, neck and shoulders as well as areas of the butt can be used as an animal toy without further shaping, construction or other modification.

Figure 2:
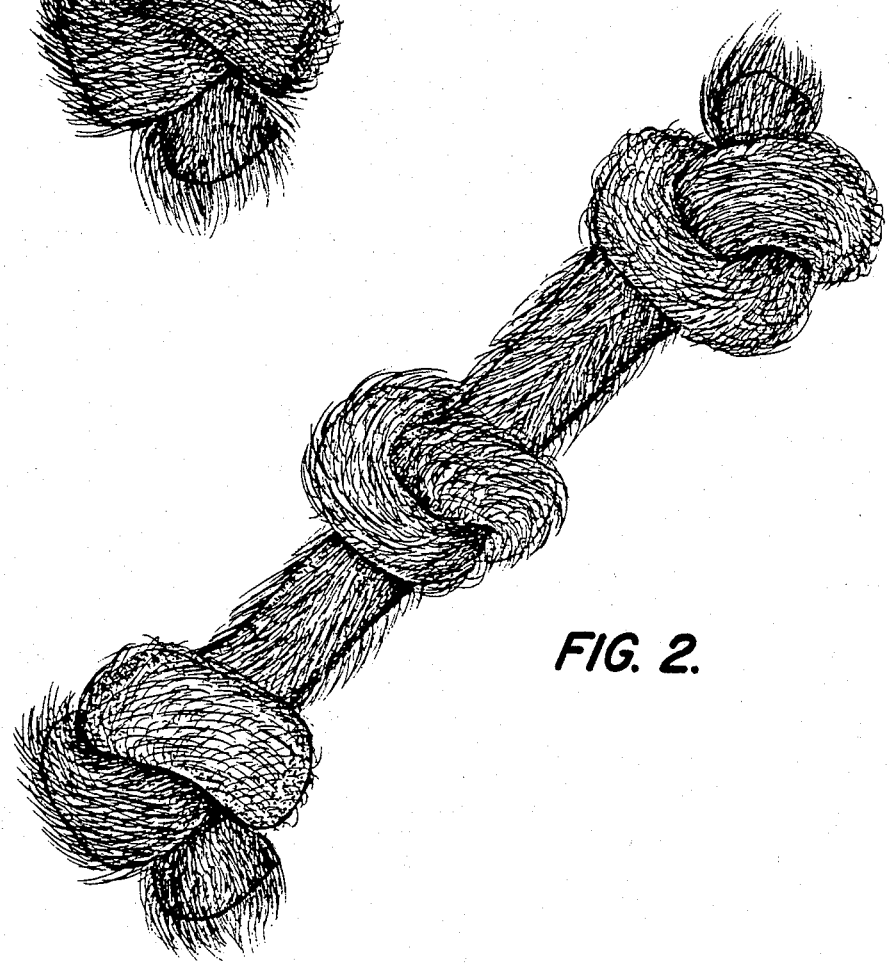
Figure 3:
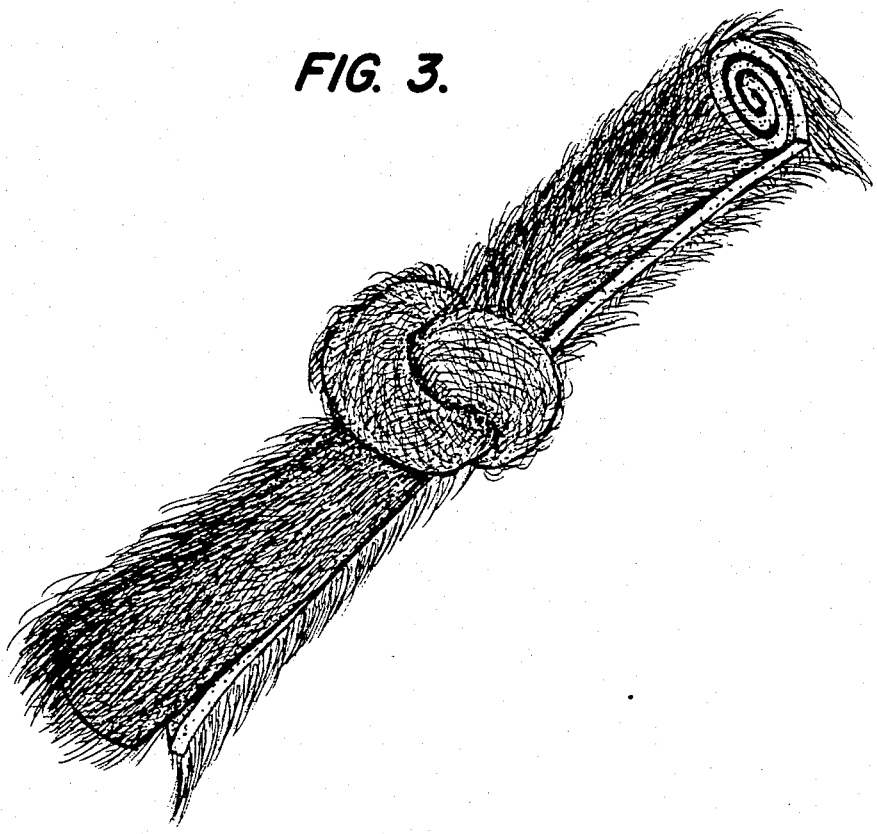

The invention is illustrated in the diagrammatic drawings. FIGS. 1, 2, 3 and 6 illustrate embodiments in which the hair-containing rawhide is rolled into cylindrical form and, in the case of FIGS. 1, 2 and 3, is knotted.

Figure 4:
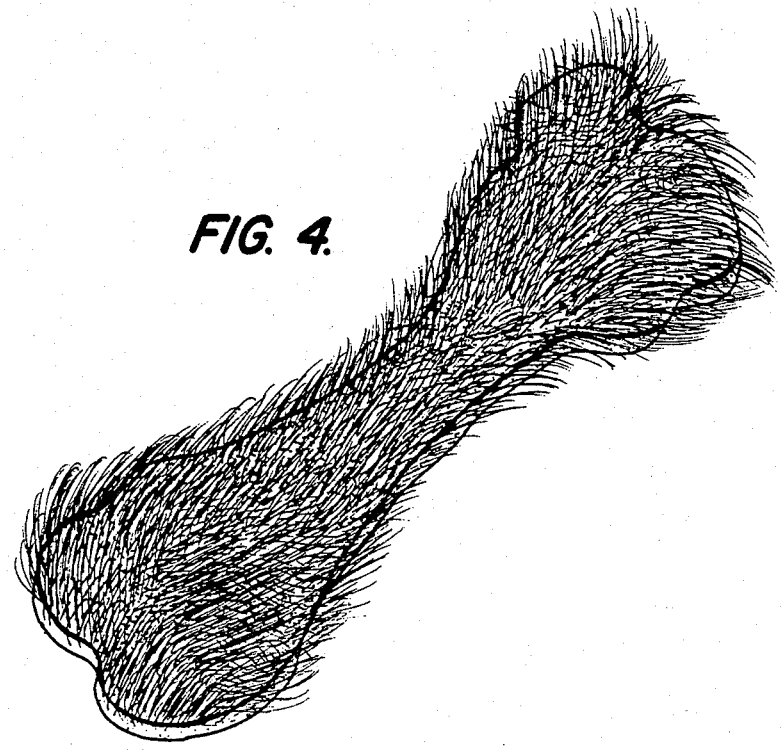
Figure 5:
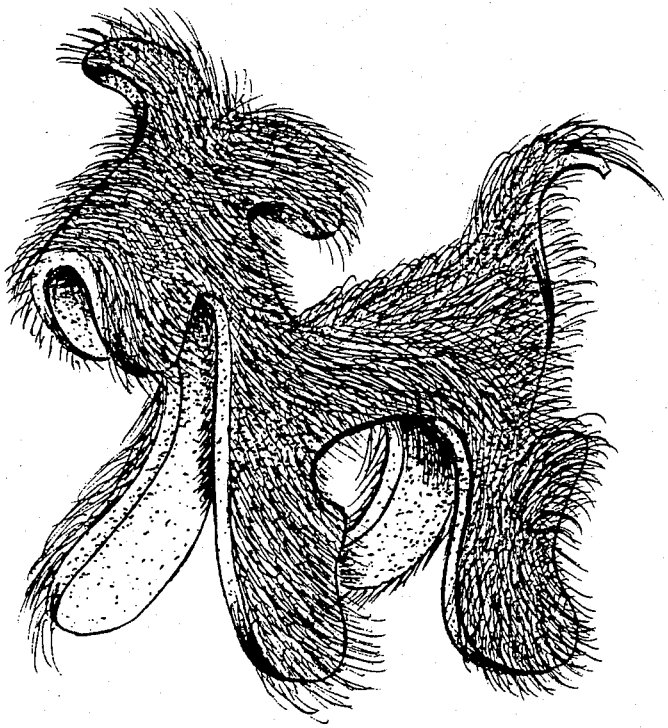
Figure 7:
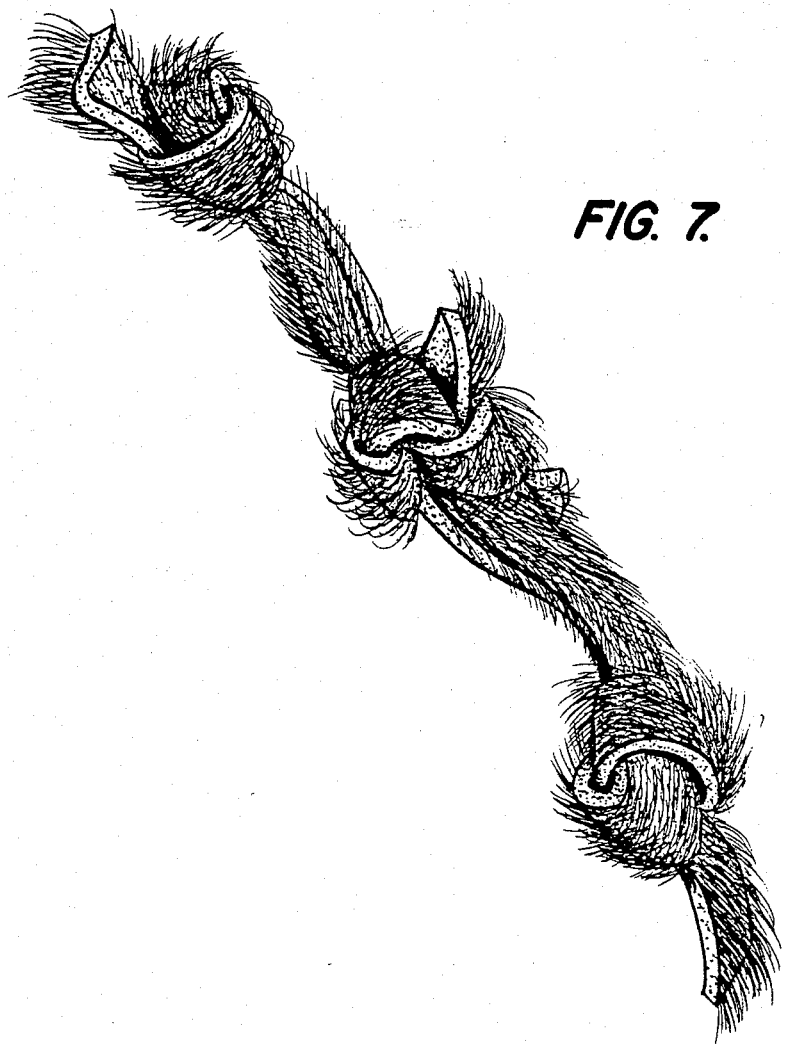

FIG. 4 illustrates a cut shape.
FIG. 5 illustrates a folded cut shape,
FIG. 7 illustrates knotted together pieces.

The following examples describe non-limiting examples and methods of preparing the product of this invention.

EXAMPLE 1

A wet rectangular piece of hair-containing rawhide was rolled into a cylindrical form or roll so that the length of the rectangle is the length of the resulting cylinder. It is then knotted by a simple overhand knot at both ends to simulate a bone shape. The knotted product was then dried in circulating warm air to yield the desired properties of hardness and uniformity of tightness. The drying process gives the knots the appearance of joints. The product formed is hard yet has give. The product is shown in FIG. 1. The presence of surface hair gives the product a soft feeling as compared to the corresponding product prepared from dehaired rawhide.

EXAMPLE 2

A product containing three knots was prepared by tying an additional knot in the center of the rolled rawhide as shown in FIG. 2.

EXAMPLE 3

A product containing only one knot was prepared by tying only one knot in the roll as shown in FIG. 3.

EXAMPLE 4

A single thickness of hair-containing rawhide is cut to various configurations such as (1) a bone shape, (2) the shape of an animal, (3) the shape of a part of an animal, etc. An example is shown in FIG. 4.

EXAMPLE 5

A single thickness of hair-containing rawhide is folded flesh side to flesh side giving a hairy appearance on both exterior surfaces. It is cut into various configurations such as the (1) shape of an animal, (2) toys, (3) geometric configurations, (4) human shapes, etc. An example is shown in FIG. 5.

EXAMPLE 6

Figure 6:
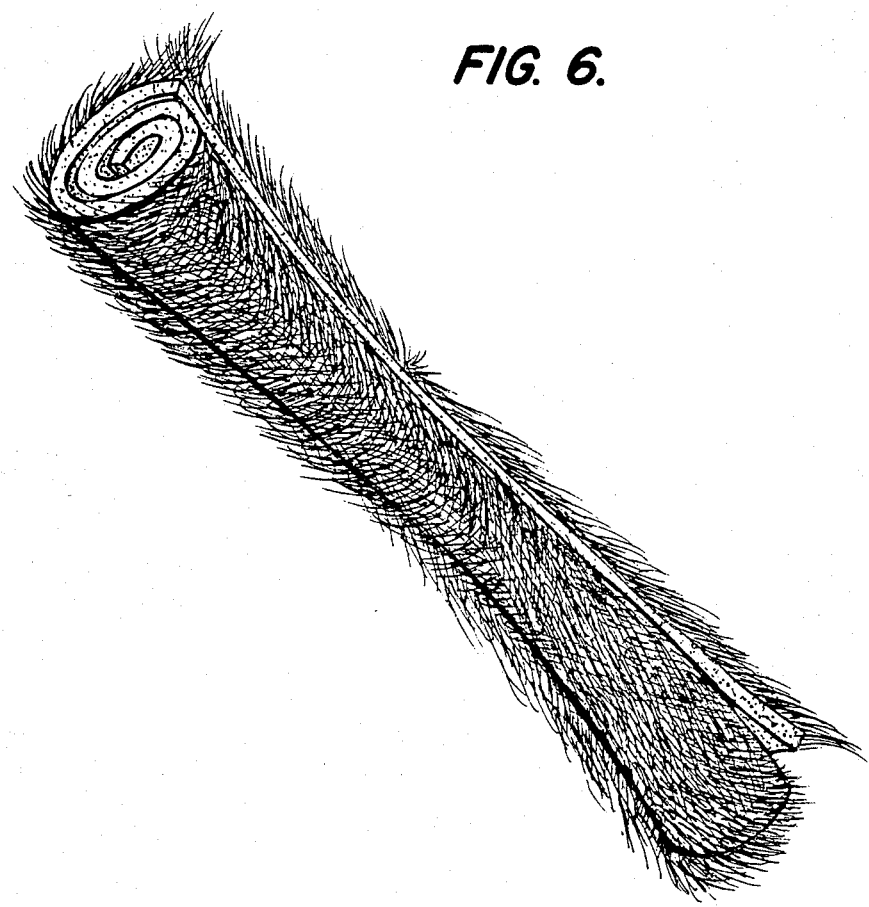

Hair-containing rawhide is rolled so that hair is on outside surface of the roll, for example as shown in FIG. 6.

EXAMPLE 7

Smaller hair-containing rawhide pieces are built up into a larger total unit such as by braiding, knotting together, etc. An example is shown in FIG. 7.

I have also found that because of its softness, humans also enjoy these toys. Children are particularly fond of its soft feel.

It should be understood that many other variations are possible within the scope and spirit of this invention and that possible configurations are limitless.

I claim:

1. An animal chew toy consisting of undehaired natural hair-containing rawhide dried to yield a hard, shape-retaining body, having inherent resiliency wherein the rawhide is in full single thickness of natural hair-containing undehaired rawhide cut in a bone shape configuration.

2. An animal chew toy consisting of undehaired natural hair containing rawhide dried to yield a hard, shape-retaining body, having inherent resiliency and is cut in an animal shape configuration.

3. An animal chew toy consisting of undehaired natural hair-containing rawhide dried to yield a hard, shape-retaining body, having inherent resiliency, comprising sections of said hair-containing rawhide knotted together to form a layer toy.

4. An animal chew toy consisting of undehaired natural hair-containing rawhide dried to yield a hard, shape-retaining body, having inherent resiliency and has hair on one side thereof and which is a single full thickness of said natural hair-containing rawhide cut in a bone shape configuration.

5. An animal chew toy consisting of undehaired natural hair-containing rawhide dried to yield a hard, shape-retaining body, having inherent resiliency, and in which the rawhide is folded flesh side to flesh side the toy having hair on both exterior sides thereof, and is cut in an animal shape configuration.

6. An animal chew toy consisting of undehaired natural hair-containing rawhide dried to yield a hard, shape-retaining body, having inherent resiliency, in which said hair-containing rawhide is rolled thus having hair on the outside of the roll and the roll has at least one knot therein.

7. The toy of claim 6 where the roll has knots at both ends.

8. The toy of claim 6 where the roll has three knots, one in the central portion and a knot at both ends.

* * * * *